United States Patent
Kossmann et al.

(10) Patent No.: US 6,168,815 B1
(45) Date of Patent: Jan. 2, 2001

(54) METHOD FOR CONTINUOUS PRODUCTION OF DRY FEED FOR FISH AND SHELL FISH

(75) Inventors: Heinrich Kossmann, Kvällsvägen 2, S-146 31 Tullinge (SE); Bent Ludvigsen, Copenhagen (DK)

(73) Assignees: Alfa Laval AB, Tumba; Heinrich Kossmann, Tullinge, both of (SE)

( * ) Notice: Under 35 U.S.C. 154(b), the term of this patent shall be extended for 0 days.

(21) Appl. No.: 09/297,948

(22) PCT Filed: Nov. 5, 1997

(86) PCT No.: PCT/SE97/01850

§ 371 Date: Jun. 22, 1999

§ 102(e) Date: Jun. 22, 1999

(87) PCT Pub. No.: WO98/19561

PCT Pub. Date: May 14, 1998

(30) Foreign Application Priority Data

Nov. 7, 1996 (SE) .................................................. 9604077

(51) Int. Cl.$^7$ ................................ A23K 1/18; A23K 1/10
(52) U.S. Cl. .......................... 426/302; 426/233; 426/315; 426/541; 426/805
(58) Field of Search ..................................... 426/233, 302, 426/315, 805, 541

(56) References Cited

U.S. PATENT DOCUMENTS

| 3,889,007 | * | 6/1975 | Gunter et al. ........................ 426/74 |
| 5,525,353 | * | 6/1996 | Fajt ..................................... 424/442 |

FOREIGN PATENT DOCUMENTS

| 02109947 | * | 4/1990 | (JP) . |
| WO 92/16115 | | 10/1992 | (WO) . |
| WO 96/01058 | | 1/1996 | (WO) . |

* cited by examiner

Primary Examiner—Chhaya D. Sayala
(74) Attorney, Agent, or Firm—Fish & Richardson P.C.

(57) ABSTRACT

In a method for production of dry feed for fish or shell fish (Crustacea) based on fresh fish raw material, vegetable carbohydrate products together with other additives are added to give a carbohydrate content in the produced feed of at least 5% during feed production. During all process steps up to the formation of feed pellets the water content is higher than 10%. The produced dry feed contains 25–60% protein, 10–40% fat and 5–25% carbohydrate. The feed contains 25–60% fish protein while the fat in the form of fish oil is up to 40%.

13 Claims, 1 Drawing Sheet

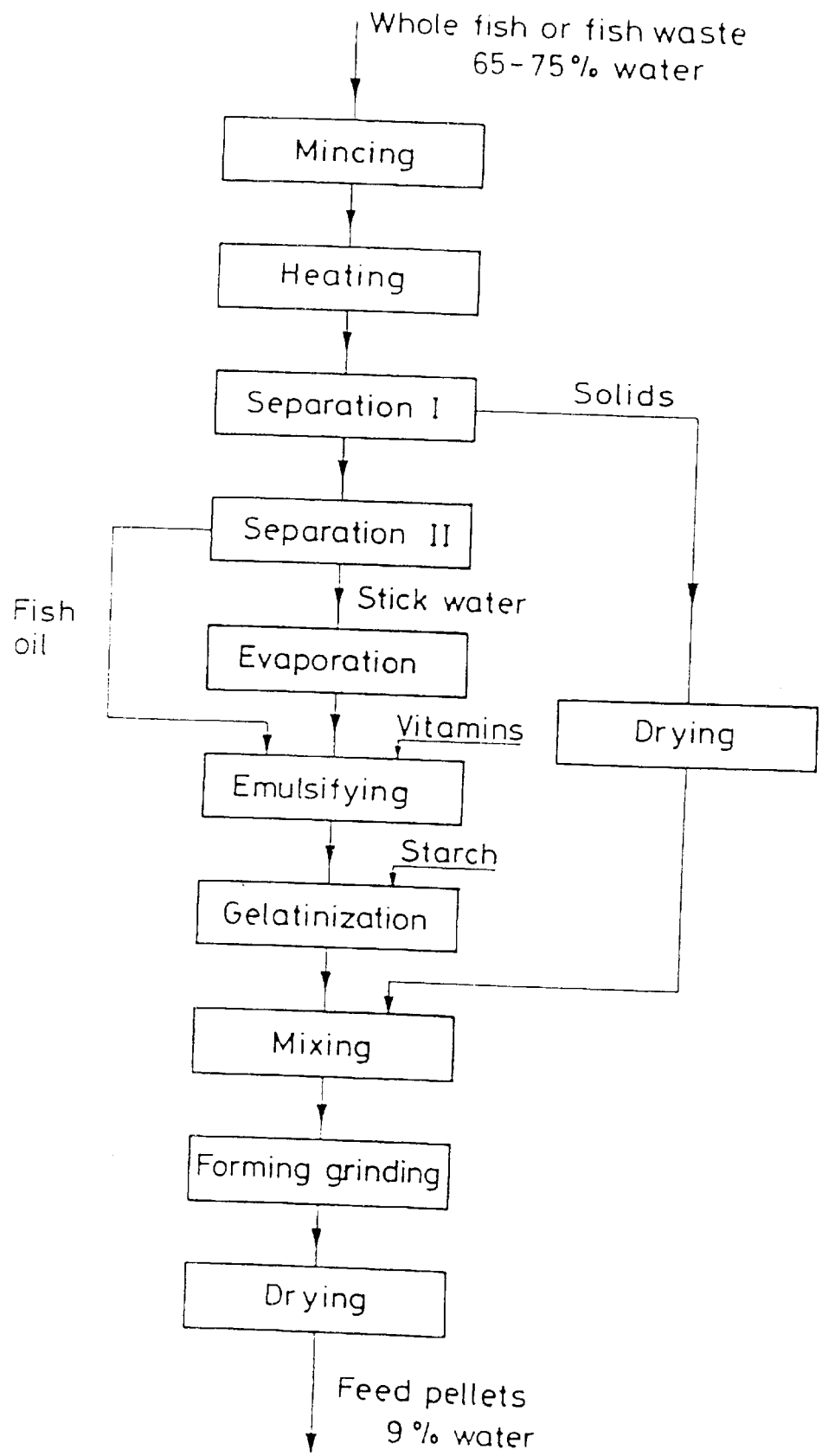

METHOD FOR CONTINUOUS PRODUCTION OF DRY FEED FOR FISH AND SHELL FISH

FIELD OF THE INVENTION

The present invention relates to a method for direct production of dry feed for fish and shell fish (Crustacea) based on fresh fish raw material.

BACKGROUND OF THE INVENTION

Farming of different species of fish and shell fish is today a very expansive line of business which also is expected to grow in many countries. Different species demand different types of feed but common for many species are demands on a high content of fish protein and fish oil. Previously fresh fish or fresh fish waste was used for production of fish feed. The fish or the fish waste was divided into pieces, mixed with different dry additives as cereal products, protein additives as fish meal or blood meal, before the mixture was formed into pellets. The water content of the formed pellets is 40%. A feed with such a high content of water has, however, a limited storage time.

Nowadays the most part of the fish feeds which are found on the market are produced from dry products, where the fish protein is in the form of fish meal. During the production of fish meal fresh fish or fish waste is heated to about 90° in order to liberate water and fish oil. During this heating the proteins are-denatured, which means that the functional qualities deteriorate. After the heating the fish material is separated mechanically in several steps, firstly free water and oil are drained from the fish material in a sieve, after that a further dewatering and defatting is carried through in a screw press. The water from the sieve and the press is clarified in a decanter and the solid phase which is separated in the decanter is added to the press cake.

The water phase from the decanter is divided in a separator into fish oil and stick water. During these process steps the temperature is kept around 90° C. in order to achieve the best possible separation of fat. After the separation the stick water is concentrated by way of evaporation in a fall film evaporator to a dry substance content of 35–40%. The concentrated stick water is mixed with the press cake and the mixture is dried in directly or indirectly heated dryers to a water content of 6–10% water. The total production time up to a finished fish meal is around 3–4 hours and both fish meal and fish oil are subjected to a considerable thermal effect during conventional production.

The fat content in the finished fish meal shall according to international standard be lower than 12%, but often the content is still lower. In order to diminish the thermal effect there is now also so called LT-meal (Low Temperature) for sale. This meal is dried under vacuum at a temperature of 75–80° C.

When producing fish feed from fish meal today different methods are used, where forming of the pellets takes place in a pelleting machine e.g. type California or through heat extrusion where the mass is cooked. The most modern method is forming by extrusion. In both methods one starts with a dry mixture with the desired composition of fish meal and fish oil, alternative protein sources, cereals and vitamins, pigments and other things. If the forming takes place by way of extrusion water is added to this dry feed mixture in order to give a homogeneous composition. Steam is introduced in the mixture in order to force the starch in the cereals to gelatinize. During the following extrusion a high pressure is built up in the product mixture and the temperature increases at the same time to about 120° C. When the product has passed the extruder the pressure is lowered and a part of the water is vaporized at the same time as the formed pellets expand, at which they get a porous structure and may absorb oil. During a subsequent coating with oil the fat content of the feed product may be increased to 20–30% fat. After extrusion the water content is high, 20–30% and the addition of oil is preceded by a warm air drying at temperatures of 50–100° C. The water content of the finished product is below 10%.

When the forming to pellets takes place in the pelleting machine the mixture is rolled through a matrix, a disc with cone shaped openings. The feed mixture is pressed through the openings by the roll with a high pressure and the formed pellet has been pressed together to a strong and solid product. The stability of the pellet depends on how hard it is pressed together. The fat content of the feed mixture may not be too high during the forming since too high an oil content gives a less powerful compressing. As a consequence of the compressing the pellet will be compact, which means that the ability to suck up oil at the following coating will be limited. The maximal fat content at a sufficient mechanical strength of the pellet is about 18%.

According to today's technology one firstly produces a fish meal from the fresh fish raw material. When producing fish meal one usually requires a low fat content in the fish meal. In order to achieve this goal one tries to reduce the amount of oil in the fish raw material during the production of fish meal.

When producing fish feed one desires on the contrary to produce a product with a high fat content and during the production process large amounts of fat are added to compensate for the low fat content in the fish meal.

During the extrusion the feed mixture must have a certain water content in order that this process step may be carried through in an optimal way. The fish meal has earlier been dried to a water content of about 10, which has brought about an impairment of the collodial bonding and nutritional value of the protein. After the extrusion the feed product is dried with temperature effect to a water content of maximally 10%, which also influences the quality of protein.

One aim of the invention is to produce a fish feed directly from fresh fish raw material and avoid the intermediate step which production of fish meals constitutes.

According to WO 96/01058 it is proposed that a fish feed is produced directly from fish material by mixing an intermediate product from the production of fish meal with a concentrate of stick water, forming the mixture to a product at a temperature of 20–120° C., which product then is dried. The feed which is produced according to this publication consists of pure fish.

SUMMARY OF THE INVENTION

According to the invention there is now proposed a method for production of dry feed for fish and shell fish from a fresh fish raw material, which involves a gentle treatment of the raw materials during all process steps up to the produced feed products, but at the same time gives possibilities for adaption to the special demands for different species of fish and shell fish.

The method according to the invention is mainly characterized in that vegetable cooked (already pasted) carbohydrates are added to the fresh fish raw material together with other additives as minerals, vitamins and binding agents during the production to feed to give a carbohydrate content in the produced feed of at least 5%. The water content in the fractions which contain fish proteins are during all process steps up to the forming to feed pellets above 10%, at which the produced dry feed contains 25–60% protein, 10–40% fat and 5–25% carbohydrates and in that the feed contains 25–60% fish protein and up to 40% fish oil. According to the proposed method the production of dry feed takes place in such a way that unnecessary drying steps are avoided which gives a feed product with a high nutritional value. Due to the fact that the said water content never falls below this value the protein remains in colloidal form.

The vegetable carbohydrate products consist of different kinds and amounts of cereals which may be metabolized by the fish species for which the feed is intended.

The proposed method is suitably carried through in such a way that a fish material obtained from fish raw material is heated to such a temperature that pasteurization/sterilization takes place and that the fish material is separated into at least two fractions, liquid and solid phase. The fraction which contains the solid phase is dehydrated during a low thermal effect to a water content which is at least 10%, while the liquid fraction is concentrated to a water content of 20–80% water. The concentrated liquid fraction is mixed with dehydrated solid phase, fish oil and a predetermined amount of carbohydrate containing products, possibly alternative protein sources and other additives. The obtained mixture is mixed together in an emulsifying step in order to give a homogeneous mixture, the water content of which is 10–40%. The obtained mixture is formed to pellets which in a finishing drying step are dried to a water content of 6–10% under low thermal effect.

With this method there is obtained a high quality of the fish feed both regards bacterial and functional quality due to the opening pasteurization alternatively sterilization. In this process step both bacteria killing and enzyme inhibition takes place. Due to the dehydration of the solid phase and the concentration of the liquid fraction, which takes place separately, optimal conditions for these measures may be available.

According to the method of the invention the feed production takes place during a short time and with a low temperature effect on the nutritive substances in the fish. The drying step is carried through in some minutes according to the invention, while the total drying time during conventional production of fish feeds may be several hours. According to the invention the temperature effect is reduced to a minimum. The method also brings about savings both regards energy and equipment.

The separation of the fish material usually takes place in such a way that three fractions are obtained, namely fish oil, stick water and solid phase. The fact that fish oil is separated as a separate phase during the separation means that this fraction does not pass any further heat treatment, at the risk of deterioration of the quality of the fish oil. If it is suitable this separation takes place in two steps namely in that the fish material is first divided into a liquid phase and a solid phase fraction in a decanter, after which the liquid fraction is separated into stick water and fish oil in a high speed separator.

According to the invention the oil is emulsified into the mixture which later is to be formed to pellets. In conventional feed production the fat has mainly been added by coating of formed pellets. This has brought about that the oil has been liberated during the feeding and has been collected at the water surface.

If one desires to produce a fish feed with a low ash content the fish raw material is brought to pass a so called "deboner", in which the backbone, the skull and gill locks are detached.

If it is suitable the fish raw material may be finely divided prior to the heating. Smaller particles give a better and more rapid heat transfer. If such a fine grinding has taken place antioxidants should preferably be added prior to the heating in order to avoid that the fat becomes rancid.

In order to be able to control the final composition of the dry feed the finely divided fish raw material may be analyzed as regards the content of protein, oil and ash. Such an analysis may be carried through using GSM (Guided Microwave Spectrometry) or MIR (Medium Infra-Red) or NIR (near Infra-Red) systems. Both these methods are rapid enough to be used in a continuous system. The result of the analyse may be used to determine the amounts of additional alternative protein and oil which are to be added to the fish material.

The fish material is with advantage heated to a temperature of 95° C. during 120 seconds. At this there is obtained a considerable killing of bacteria with a minimal thermal effect on the fish proteins and fatty acids in the fish oil.

Preferably concentrated stick water and fish oil and additives are mixed to a homogeneous emulsion in a first mixing operation. This emulsion is mixed with carbohydrate products and is homogenized to a paste like mixture in a second mixing step. In the third mixing step the dehydrated solid phase is added, possibly together with additional protein and taste giving substances to the paste like mixture. The obtained mixture comprising all components is formed to pellets by semi-moist low pressure extrusion.

The pellets which are produced according to the invention may be coated with taste increasing substance such as cuttle-fish extract or something else.

BRIEF DESCRIPTION OF THE DRAWING

The method according to the invention is described further with reference to the attached drawing which shows a flow chart over a process according to the invention chosen as an example.

DETAILED DESCRIPTION

Whole fish, fish waste or finely divided fish with a water content of 65–75% with an added antioxidant is finely divided and added to an indirectly working scrape heat exchanger and is heated in a predetermined degree.

After the desired heat treatment, which may be a pasteurization or a sterilization, the fish material is directed to a separator, suitably a decanter with a horizontal axis, in which the fish material, in the embodiment shown on the drawing, is divided into two phases, one liquid fraction and one solid phase fraction. The liquid fraction is directed to a high speed centrifugal separator and is divided into stick water and oil. If so is desired one may instead use a three phase decanter.

The stick water phase from the second separation step is suitably evaporated to a water content of 55–65% in a fall-film evaporator or a plate heat exchanger. If so is desired this concentration may instead take place by way of ultra-filtration. The solid phase from the first separation is rapidly and leniently dried to a water content of 10–20%, which ensures that the functional qualities of the proteins are preserved in the best way.

The concentrated stick water phase is mixed with the fish oil and with micro ingredients such as vitamins, pigments and emulsifiers at a temperature of 60–90° C. This mixture is emulsified to a homogeneous liquid phase which is mixed with cooked starch with a high degree of gelatinization, which gives a paste like mixture.

The semidry solid phase which has been obtained after the drying is mixed with the already pasted liquid phase and mixed to a dough like mixture. The obtained mixture has a water content of 20–30% and contains 25–32% oil counted on the dry substance, which oil is bound in the mixture.

With such a mixture the forming to pellets may be simplified and this may take place in apparatus similar to the one used for forming of soft pellets, so called moist or semi-moist pellets. At that the mixture is pressed through a disc provided with openings with knives forming the pellets. The forming gives pellets of a desired diameter and length. Feed products in the form of granules for smaller fishes are traditionally produced by crushing pellets with a following sifting to the desired particle sizes.

The formed pellets are thereafter dried to a water content of 6–10%, at which there is obtained a storage stable feed product. The formed pellets have a sufficient mechanical strength to keep their shape during transportation and handling. They have also the right sinking speed and the oil is not liberated during the feeding, since it is emulsified in the product for the most part.

If so is desired a higher oil content may be obtained by coating after the forming to pellets.

In a process according to this example the process time from delivering the fish raw material to the plant until drying of the formed pellets may be kept as short as down to 30 minutes.

The method according to the invention is described further in the following example of the mass balance in a feed producing process.

The expression dry substance refers in the following to fat free dry substance.

1000 kg fish raw material (herring) with a fat content of 11.9% fat, 70.2% water and 17.9% dry substance is heated in a scrape heat exchanger, Contherm™, during 120 seconds, 95° C., after which the fish material is directed to a decanter. In this the fish material is divided into two fractions, where the solid phase fraction, 364 kg, contains 3.8% fat, 62.1% water and 34.1% dry substance. The solid phase fraction is forwarded to a dryer, in which 198 kg water is evaporated. The dried solid phase fraction, 166 kg, contains 8.3% fat, 17.0% water and the dry substance content is 74.7%.

The liquid fraction from the decanter, which is 636 kg, contains 16.5% fat, 74.9% water and 8.6% dry substance. This fraction is directed to a high speed centrifuge and is divided into three fractions, fish oil, stick water and sludge. The fish oil amounts to 97 kg with a fat content of 99%. The stick water, 423 kg, contained 0.8% fat, 7.6% dry substance and had a water content of 91.6%. The sludge fraction had a weight of 117 kg, contained 4.5% fat and 76.3% water and 19.2% dry substance. The sludge fraction and the stick water fraction are remixed and directed to an evaporator, in which 359 kg water was driven away. The concentrated stick water fraction, 180 kg, contained 4.8% fat, 65.0% water and 30.2% dry substance.

The fish oil, 97 kg, was mixed in an emulsifying step with the concentrated stick water, 180 kg, and 6 kg micro-ingredients. The emulsified liquid, which amounts to 444 kg, contained 26.8% fat, 32.9% water and 40.3% dry substance. In the next mixing step, the gelatinization step, 74 kg cereals with a water content of 10% was added. From this second mixing step there was obtained 518 kg feed mixture containing 17.4% fat, 22.4% water and 60.2% dry substance.

After further homogenization of the mixture it is formed to pellets in the forming equipment. The formed pellets are dried in a vertical dryer, at which 113 kg water was driven away. As end result there was obtained 405 kg pellets containing 29.5% fat, 10% water and 60.5% dry substance. In the dry substance there is ash 7.4%, protein 37.4% and carbohydrate 15.7%.

What is claimed is:

1. A method for continuous production of dry feed for fish and shell fishes based on fresh fish raw material, comprising the steps of adding vegetable carbohydrate products and one or more additives selected from one or more minerals, vitamins, antioxidants and binding agents to the fresh fish raw material during the feed production until the carbohydrate content of the produced feed is at least 5% and maintaining a water content of fractions which contain fish proteins during the production up to the formation of feed pellets higher than 10%, to produce a dry feed containing 25–60% protein, 10–40% fat and 5–25% carbohydrates wherein the feed contains 25–60% fish protein while the fat in the form of fish oil is up to 40% of the feed.

2. The method according to claim 1, further comprising the steps of heating the fish material obtained from fish raw material to such a temperature that pasteurization or sterilization takes place, separating the fish material into at least two fractions, comprising liquid and solid phases, dehydrating the fraction which contains the solid phase under a low thermal effect to a water content which is at least 10%, concentrating the liquid fraction to a water content of 20–80%, mixing the concentrated liquid fraction with dehydrated solid phase, fish oil, a predetermined amount of carbohydrate containing products, alternative protein sources and additives, mixing the thus obtained mixture in an emulsifying step in order to give a homogeneous mixture, the water content of which is 10–40%, forming pellets from the obtained mixture, and drying the formed pellets to a water content of 6–10% during low thermal effect.

3. The method according to claim 2, wherein the fish material is separated into three fractions, comprising fish oil, stick water and solid phase.

4. The method according to claim 2, wherein said separation takes place in two steps.

5. The method according to claim 2, wherein the fresh fish raw material is finely divided prior to the heating step.

6. The method according to claim 5, wherein antioxidants are added to the finely divided fish mixture.

7. The method according to claim 5, wherein the composition of the finely divided fish mixture is measured for protein, oil and ash content using a rapid method selected from near infra-red, medium infrared and guided microwave spectrometry and using the content information to control addition of alternative protein sources, oil and carbohydrates.

8. The method according to claim 2, wherein the fish material is heated to 95° C. during 120 seconds.

9. The method according to claim 3, wherein the stick water is concentrated and the concentrated stick water and fish oil and additives are mixed to form a homogeneous emulsion in a first mixing operation.

10. The method according to claim 9, wherein the emulsion is mixed with carbohydrate products and homogenized to a paste-like mixture in a second mixing step.

11. The method according to claim 10, wherein said paste-like mixture is mixed with a dehydrated solid phase, optionally together with additional protein and taste giving substances in a third mixing step.

12. The method according to claim 11, wherein the mixture resulting from the third mixing step is formed to pellets by way of a semi-moist low temperature extrusion.

13. The method according to claim 2, comprising coating produced feed pellets with taste giving substances.

* * * * *

UNITED STATES PATENT AND TRADEMARK OFFICE
CERTIFICATE OF CORRECTION

PATENT NO. : 6,168,815 B1 Page 1 of 1
DATED : January 2, 2001
INVENTOR(S) : Heinrich Kossmann and Bent Ludvigsen It is certified that error appears in the above-identified patent and that said Letters Patent is hereby corrected as shown below:

Column 2,
Line 37, change "10" to -- 10% --.

Column 4,
Line 13, change "analyse" to -- analysis --.

Signed and Sealed this

Sixteenth Day of December, 2003

JAMES E. ROGAN
*Director of the United States Patent and Trademark Office*